Sept. 2, 1952        O. M. STUETZER        2,608,722

PROCESS FOR MAKING MICROSPACERS

Filed Sept. 6, 1950        2 SHEETS—SHEET 1

INVENTOR.
OTMAR M. STUETZER
BY Wade Koontz
ATTORNEY
James S. Shannon
AGENT

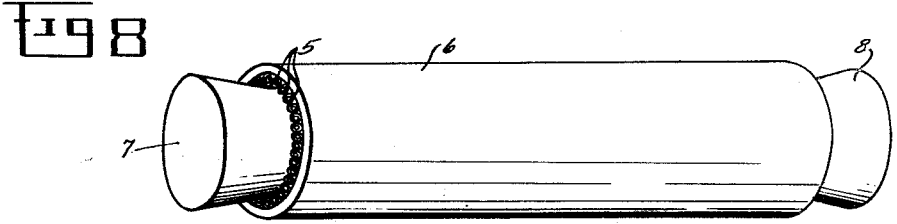
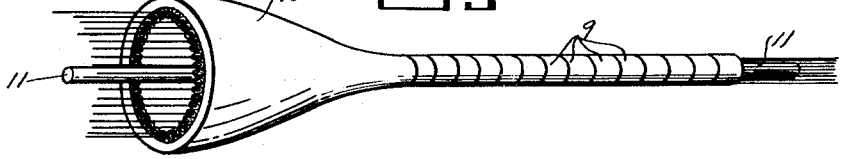
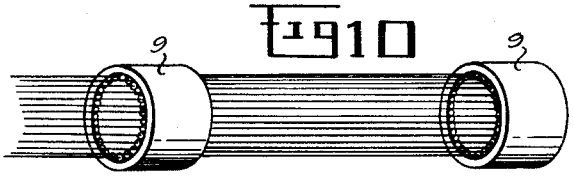 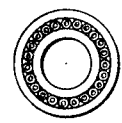
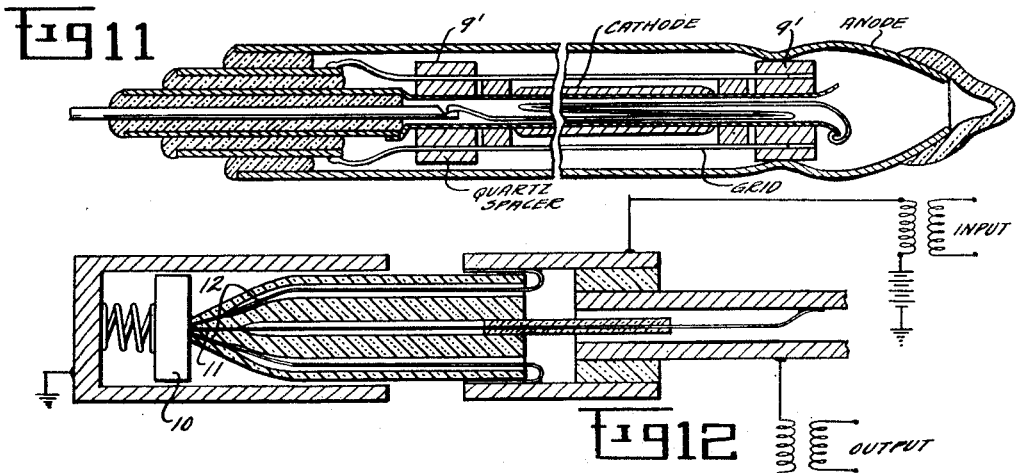
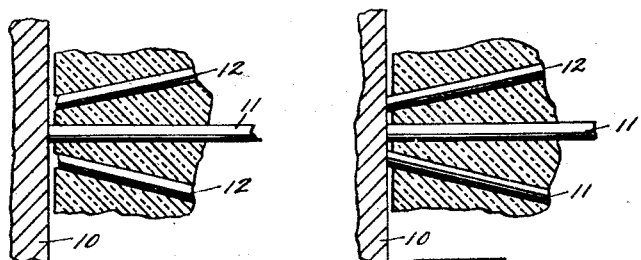

Patented Sept. 2, 1952

2,608,722

UNITED STATES PATENT OFFICE 2,608,722

PROCESS FOR MAKING MICROSPACERS

Otmar M. Stuetzer, Dayton, Ohio

Application September 6, 1950, Serial No. 183,455

4 Claims. (Cl. 18—48)

(Granted under the act of March 3, 1883, as amended April 30, 1928; 370 O. G. 757)

The invention described herein may be manufactured and used by or for the Government for governmental purposes without payment to me of any royalty thereon.

This invention relates to spacers of very small dimensions and in particular to insulating spacers for supporting small conductors or semiconductors in extremely close but nevertheless electrically insulated relationship.

The object of the invention is a process for manufacturing microspacers that are cheap, accurate, stable and reproducible within close limits, and in which separations as small as 0.00004" are possible.

The essential feature of the process is that the spacers are first made up in the desired geometry using parts of sufficient size to be easily handled. These parts may be, for example, standard glass, quartz or plastic tubing. The assembly is then rendered plastic through heat or chemical action and drawn down to the desired size taking care that the original geometry does not change. At a suitable point in the drawing process the conductor or semi-conductor electrodes may be inserted and the drawing continued. For extremely close spacing the assembly may be twisted during the final drawing until the electrodes touch. The spacer is then cut at the point of contact and ground back until the desired spacing is obtained.

In the electrical field some examples of applications in which the microspacers so produced find utility are in the grid construction of subminiature electron tubes, as electrode supports for transconductive devices using semi-conductors, such as the "Transistor" and "Fieldistor," the latter being described and claimed in my patent application Serial No. 119,541 filed October 4, 1949; in small thermocouples, in the construction of thyratron igniters, and in electrolytic interrupters. In the accoustical and medical fields the spacers may be used in the manufacture of small microphones, accelerator meters, sondes and probes.

The process will be described more fully in connection with the specific examples shown in the accompanying drawings, in which Fig. 1 shows the initial assembly for a seven electrode spacer;

Fig. 8 shows another initial assembly from which cylindrical spacers for use in small cage grids may be made;

Fig. 9 shows the method of inserting grid wires in cylindrical spacers;

Fig. 10 shows cylindrical spacers used in a cage grid;

Fig. 11 shows a subminiature vacuum tube using grid spacers made by the process shown in Figs. 8 and 9;

Fig. 11a shows the cross section of a grid spacer used in Fig. 11;

Fig. 12 shows a transconductive device using a spacer of the type shown in Fig. 6;

Fig. 13 shows the electrode structure for use in a transconductor of the "Fieldistor" type; and Fig. 14 shows the electrode structure for use in a transconductor of the "Transistor" type.

It is known that cylindrical pieces of material of certain plasticity can be drawn down and their cross sections permanently reduced with a corresponding gain in length by applying longitudinal and sometimes radial forces. This fact is widely used for cross sections of complete axial symmetry, i. e. for rods and tubes of circular cross section.

The technique to be described uses the experimental fact that for many materials a degree of plasticity exists where very complex cross sections also can be drawn down, the geometry staying surprisingly similar. The law of similitude will be very closely fulfilled within a certain range of plasticity. The closer the geometry of the cross section approaches circular symmetry the wider will be the range of viscosity that may be employed. These rather general statements will be illustrated and explained with a few examples:

Hard and soft glasses are very well suited for a drawing down process of this type. For example, a seven electrode spacer may be made from the initial assembly shown in Fig. 1. The tubes 1 may be standard glass tubing of about 3 mm. outside diameter and 50 mm. long. These seven tubes are fitted snugly into a larger glass tube 2 of the proper size. The assembly is then heated in the center for about 20 mm. of its length and drawn down fast by axial pull to a length of about 4 ft.

Figure 2:
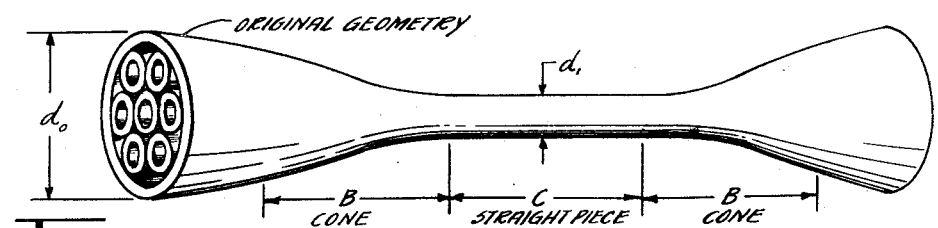
Fig. 2 shows a step in the drawing process of the assembly shown in Fig. 1.

The appearance of the spacer after the first drawing process is shown in Fig. 2, with the longitudinal scale compressed however. The reduction in diameter $d_0:d_1$ obtained is of the order of 20. Three sections are roughly defined, namely, the two tapered or conical sections B and the straight section C. Measurements on the cross sections of the original assembly and the cross section of section C show that the law of similitude is not exactly fulfilled between the original assembly and the drawn down section but that the configuration stays similar, i. e. round holes stay round over a wide range of viscosity. The ratio $r$ of wall thickness of tube elements to diameter of tube elements, however, changes somewhat, in all cases in favor of the wall thickness. Depending upon the temperature and on the original ratio, changes in $r$ of 5% to 25% may occur. But, if the temperature of drawing is kept constant, this ratio will stay constant within 5% for consecutive samples of the same geometry with diameter reduction ratios between 15 and 25. The reproducibility of spacer geometries, therefore, is satisfactory, the main difficulty being to select the original tubing within the required tolerances which should not exceed 3%.

In the above it is assumed that the sample to be drawn is heated uniformly. However, if the inside of the sample is not as hot as the outside the inside holes will become larger than the outside holes in the drawing process, but the configuration will stay symmetrical. The opposite effect can be achieved if the sample is allowed to cool a little from the outside before drawing. By blowing a cooling gas, preferably hydrogen, through such holes as are wanted to become larger than the rest many desired variations may be obtained.

Figure 1:
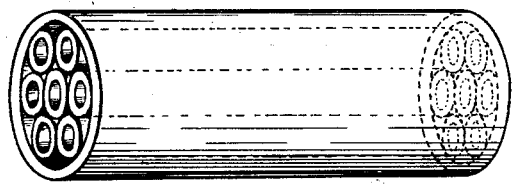

The original sample need not be composed of a number of assembled pieces as in Fig. 1 but may also be a drilled or pressed block of material.

The noncritical drawing temperature of all kinds of glass is closer to the softening point than to the working point mentioned in glass specifications. If quartz instead of glass is used its higher viscosity and heat conductivity make necessary much narrower temperature tolerances. The element tubes, in the case of quartz, must be fused together before drawing and thorough, uniform heating is required, the optimum drawing temperature being about midway between the softening and working points.

Plastics such as polystyrene and "Plexiglas" may be drawn down in accordance with the above technique if adequately softened by heat or chemicals. The original samples may be cast, molded, drilled or punched. With proper care, square or rectangular cross sections of inside holes or outside boundaries can be used.

Figure 3:
Fig. 3 shows the method of reinforcing the spacer during the drawing process.

Returning to the process of making a microspacer, the section C in Fig. 2 may be removed and subjected to an additional drawing process to further reduce the size of the passageways therethrough. The resulting section C of the new sample may also be further drawn down if required. If, during repeated drawing processes, the sample becomes too fragile to handle it may be reinforced by placing it inside another tube as shown in Fig. 3. The reinforcing tube will fuse with the spacer during the succeeding drawing process. By repeating this reinforcing technique as the drawing proceeds a spacer which is large and strong enough to be easily handled and which has extremely small passageways through its center may be obtained.

Figure 4:
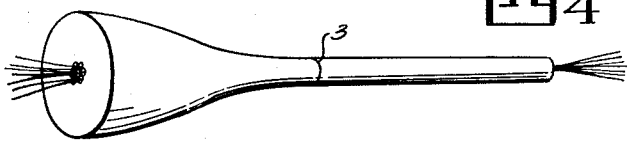
Fig. 4 shows the method of inserting electrode wires into the spacer.

If wire electrodes are to be inserted in the passageways of the spacer this should be done when the size of the passageways is the minimum size that will permit the wires to be inserted. Since the passageways are almost perfectly round they need be only slightly larger than the wires. The technique for inserting the wires is shown in Fig. 4. After the passageways in the straight portion C of a drawn sample have been reduced to a size only slightly larger than that of the wires the straight portion is cut from the conical portion as at 3 in Fig. 4. After cutting, however, the two pieces are held together in their original positions which can be accomplished with great accuracy of alignment due to the slight irregularities in cut glass which again fit together. The wires may then be very easily filed through the conical section, where the passageways are large, into the straight section. The conical section may then be removed having the wires in the straight section. It is also possible to cut the straight section away after the wires have been inserted, however, this operation requires considerable skill if there is a close fit between the wires and passageways.

After the metal wires have been inserted, further drawing down of the spacer may be carried out over the wires provided the melting point of the metal is appreciably above the drawing temperature of the spacer material. In this way the spacings between the electrodes may be still further reduced.

Figure 7:
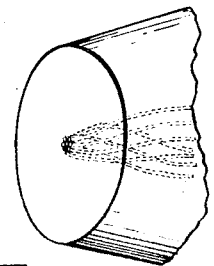
Fig. 7 is an enlarged view of the end portion of the spacer shown in Fig. 6 in which twisting was employed.
Figure 5:
Fig. 5 shows the method of producing extremely close electrode spacings by twisting.
Figure 6:
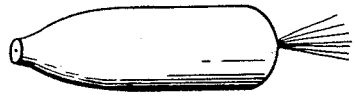
Fig. 6 shows a spacer derived from Fig. 5.

For extremely close spacings of electrodes the technique illustrated in Figs. 5, 6 and 7 may be used. After the spacer has been drawn down to small size and the electrode wires inserted, the sample is heated over a short distance after which it is slightly drawn and at the same time twisted through about one turn as shown in Fig. 5. The sample is then cut at the center of the twist, or at a point where the lateral spacing is less than that desired, and ground back until the desired lateral spacing is obtained. The resulting spacer is shown in Fig. 6, the end of which is shown in enlarged form in Fig. 7. By this method, using tungsten or platinum wires having outside diameters as small as 5 microns lateral spacings of the order of the wave length of visible light have been attained and measured electrically but of course could not be photographed or seen under the microscope. Larger separations of between 2 and 100 microns can be reproduced with an accuracy of five to thirty percent.

Another type of spacer suitable for use in the grid structure of subminiature tubes is shown in Figs. 8, 9 and 10. The initial assembly consists of a number of small tubes 5 fitted into the inside of a larger tube 6 as shown in Fig. 8. Corks 7 and 8 may be used to hold the smaller tubes in place prior to the initial drawing process during which the tubes 5 become fused to the tube 6 so that the corks are no longer required. The assembly is subjected to as many drawings as necessary to reduce the diameter to the required size. When the required diameter is reached small sections are cut from the sample to serve as grid wire spacers, such as shown in Fig. 10.

If the size of the spacers and the holes therein are so small as to make the insertion of the grid wires difficult the technique shown in Fig. 9 may be used, this technique being particularly useful in the manufacture of a quantity of grid spacers.

After the final drawing a number of spacers 9 are cut from the sample as shown in Fig. 9. These spacers are then reassembled along with one of the tapered end sections 10 in their original order over a mandrel 11 of wood or other suitable material. The small irregularities in the mating cut edges serve to realign the pieces in their original positions so that after assembly over the mandrel the holes are continuous and in alignment throughout the sample. The wires may then be easily inserted in the larger holes of the tapered end section 10 which serves to guide the wires into the spacers. After the wires have been pushed through all the spacers, individual pairs with enough wire to form grids of the desired length, as shown in Fig. 10, may be removed from the right hand end. Any suitable material such as glass, quartz or plastic may be used in the above process.

A subminiature triode power tube using spacers of the above described type is shown in Fig. 11. The tube is of coaxial design throughout which makes it particularly suitable for high frequency use. Such tubes can be made with outside diameters as small as 3 mm., yet having a power output of 2 watts. For the grid spacers 9' shown in Fig. 11 the initial assembly, corresponding to that shown in Fig. 8, may have the geometrical cross-section arrangement shown in Fig. 11a.

One use for spacers of the type shown in Figs. 6 and 7 is shown in Fig. 12. The apparatus shown is a transconductive device employing a semiconductor 10. The center electrode 11 touches the semiconductor and serves as the output electrode. The surrounding conductors 12 serve as the input electrodes. In the case of a "Fieldistor," as described in my above mentioned application, the control electrodes are brought as close to the semiconductor and the output electrode as possible in order to control the electrical field in the semiconductor at the point of contact. This condition is shown in Fig. 13. In the case of a "Transistor" the control electrodes touch the semiconductor as shown in Fig. 14. In both cases, however, the object is to bring the control electrodes as close to the output electrodes as possible without electrical contact.

There are several methods of causing the electrodes to extend slightly beyond the surface of the glass as in Fig. 14 and in the case of the output electrode in Fig. 13. If the electrodes are made of a harder material than glass, for example, tungsten, grinding with a suitable powder, such as aluminum oxide, will remove the glass faster than the electrode material with the result that the electrodes extend 3 to 5 microns above the surface of the glass. Coarser grinding powder will result in greater protrusion of the electrodes and more rounded ends. If fine powder is used the ends of the electrodes will be almost flat and protrude about ½ micron above the glass. Another method of achieving this result is to etch away the glass by means of hydrofluoric acid, however, this method results in a rougher glass surface. In cases where the electrodes are to be shortened, as for electrodes 12 in Fig. 13, this may be accomplished by submerging the ends of the electrodes in a suitable electrolyte and connecting the electrodes to be shortened in a direct current circuit for electrolytically etching away the desired amount of metal. For tungsten a 2% water solution of sodium hydroxide and a current density of about 100 amps./cm.$^2$ is recommended. It is also possible to change the shape of the electrode ends electrolytically; short etching with high voltage and low concentration electrolyte will produce points on the ends of the wires.

As already mentioned it is possible to make the electrodes of semiconductive rather than conductive material. In this process the holes in the spacers at the beginning or early in the drawing process are partly filled with germanium powder instead of metal and then drawn down and, if necessary, twisted as described above for metal electrodes. The germanium will be kept together by the surface forces of the glass to form germanium electrodes. Silicon electrodes can likewise be obtained if quartz of a very high melting point glass is used.

I claim:

1. The process for making a microspacer having a plurality of small closely spaced longitudinal passageways arranged in a desired cross-sectional configuration, said process comprising the steps of (1) assembling a comparatively large spacer comprising a larger tube and a plurality of smaller tubes positioned within said larger tube and extending longitudinally thereof, said smaller tubes being so positioned within said larger tube that their passageways are arranged in the same cross-sectional configuration as that desired in said microspacer, (2) transforming said spacer assembly into a ductile state, (3) drawing said assembly to reduce the cross-sectional dimensions without changing the cross-sectional configuration, (4) removing a section of the drawn assembly, (5) transforming said removed section into a ductile state, (6) further drawing said section to reduce still further the cross-sectional dimensions, (7) repetition of steps (4), (5) and (6) until the removed section becomes too small and fragile to handle, (8) reinforcing said last mentioned removed section by placing a closely fitting tube of the same material as the original tubing thereover, (9) transforming said reinforced section into a ductile state, (10) drawing said reinforced section to reduce the cross-sectional dimensions, and (11) repetition of steps (7), (8), (9) and (10) until the desired lateral spacings of the passageways in the spacer are obtained.

2. The process for making a quartz microspacer having a plurality of small closely spaced longitudinal passageways arranged in a desired cross-sectional configuration, said process comprising the steps of (1) assembling a comparatively large spacer comprising a larger quartz tube and a plurality of smaller quartz tubes positioned within said larger tube and extending longitudinally thereof, said smaller tubes being so positioned within said larger tube that their passageways are arranged in the same cross-sectional configuration as that desired in said microspacer, (2) fusing said tubing together, (3) transforming said fused spacer assembly into a ductile state, (4) drawing said assembly to reduce the cross-sectional dimensions without changing the cross-sectional configuration, (5) removing a section of the drawn assembly, (6) transforming said removed section into a ductile state, (7) further drawing said section to reduce still further the cross-sectional dimensions, (8) repetition of steps (5), (6) and (7) until the removed section becomes too small and fragile to handle, (9) reinforcing said last mentioned removed section by placing a closely fitting tube of the same material as the original tubing thereover, (10) fusing said tube to said last mentioned removed section, (11) transforming said reinforced section into a ductile state, (12)

drawing said reinforced section to reduce the cross-sectional dimensions, and (13) repetition of steps (8), (9), 10), (11) and (12) until the desired lateral spacings of the passageways in the spacer are obtained.

3. The process for making a microspacer having a plurality of small closely spaced passageways arranged in a desired cross-sectional configuration and each containing a fine wire electrode, said process comprising the steps of assembling a comparatively large spacer comprising a larger tube of insulating material and a plurality of smaller tubes of the same insulating material positioned within said larger tube and extending longitudinally thereof, said smaller tubes being so positioned within said larger tube that their passageways are arranged in the same cross-sectional configuration as that desired in said microspacer, transforming said spacer assembly into a ductile state over a portion of its length, drawing said assembly to produce a sample having a straight section of reduced cross-sectional dimensions at the center and tapered transitional sections at each end with the passageways in the straight section slightly larger than said electrode wires, cutting said straight section from said transitional sections, positioning said cut straight section against one of said transitional sections in its original position and alignment, threading said electrode wires into said transitional section and thence into and through said straight section, removing said transitional section, transforming said straight section into a ductile state, and drawing said straight section over said wires until the lateral spacing between the wires is reduced to the desired amount.

4. The process for making a microspacer having a plurality of small closely spaced passageways arranged in a desired cross-sectional configuration and each containing a fine wire electrode, said process comprising the steps of assembling a comparatively large spacer comprising a larger tube of insulating material and a plurality of smaller tubes of the same insulating material positioned within said larger tube and extending longitudinally thereof, said smaller tubes being so positioned within said larger tube that their passageways are arranged in the same cross-sectional configuration as that desired in said microspacer, transforming said spacer assembly into a ductile state, drawing said assembly to reduce the cross-sectional dimensions to the point at which the passageways therethrough are only slightly larger than said electrode wire, threading said electrode wires through said passageways, again transforming said assembly into a ductile state, slightly drawing said assembly and at the same time twisting same through about one turn, cutting said assembly transversely at or near the center of twist, and grinding said assembly back until the lateral spacing between electrode wires is that desired.

OTMAR M. STUETZER.

REFERENCES CITED

The following references are of record in the file of this patent:

UNITED STATES PATENTS

| Number | Name | Date |
|---|---|---|
| 1,992,678 | Studt et al. | Feb. 26, 1935 |
| 2,287,598 | Brown | June 23, 1942 |